Figure 1:
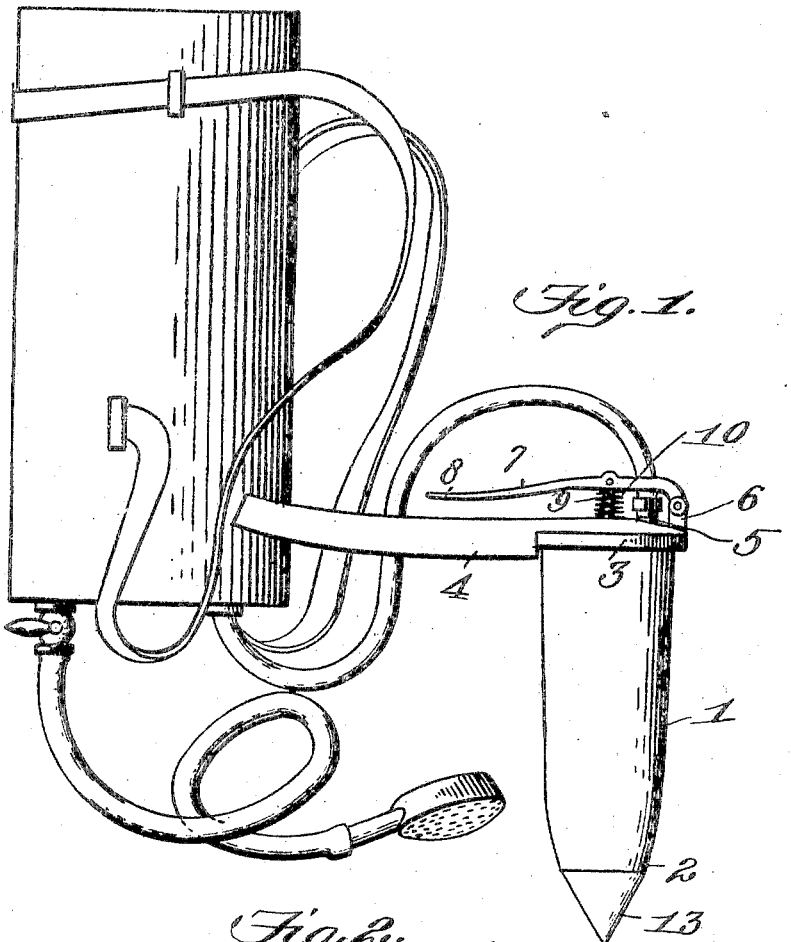

No. 797,531. PATENTED AUG. 15, 1905.
T. J. PETERS.
TRANSPLANTING IMPLEMENT.
APPLICATION FILED JULY 18, 1904.

2 SHEETS—SHEET 1.

Witnesses:

Inventor
Thomas J. Peters
By James L. Norris
Atty.

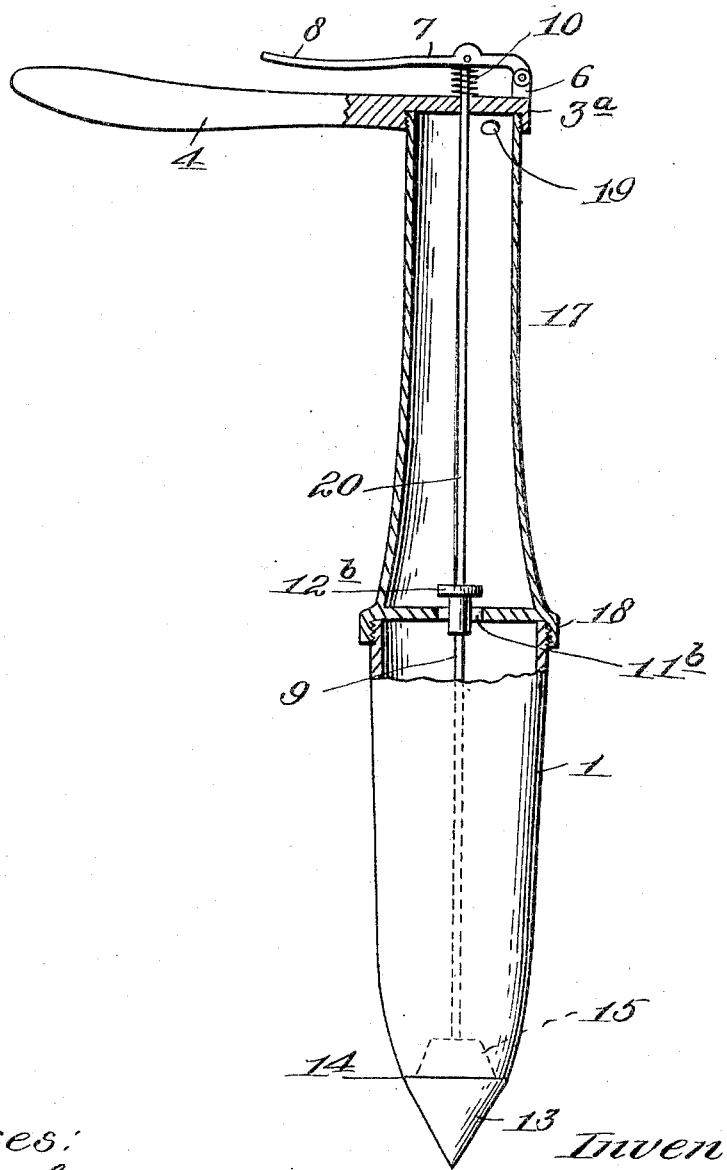

UNITED STATES PATENT OFFICE.

THOMAS J. PETERS, OF OWINGSVILLE, KENTUCKY.

TRANSPLANTING IMPLEMENT.

No. 797,531.            Specification of Letters Patent.            Patented Aug. 15, 1905.

Application filed July 18, 1904. Serial No. 217,092.

*To all whom it may concern:*

Be it known that I, THOMAS J. PETERS, a citizen of the United States, residing at Owingsville, in the county of Bath and State of Kentucky, have invented new and useful Improvements in Transplanting Implements, of which the following is a specification.

This invention relates to implements for transplanting, moistening, or fertilizing plants, particularly tobacco-plants; and the purpose thereof is to provide a simple and effective device for forming a receptive opening in the ground or soil to receive a plant and afterward operative to deposit a liquid, such as water, over the plant and around the roots of the same.

A further purpose of the invention is to provide means for facilitating the operation of transplanting without tiring the operator or person to the extent heretofore experienced in ordinary transplanting operations.

A still further purpose of the invention is to facilitate transplanting growths or tobacco-plants which are preliminarily sprouted to an early stage of development by reducing the number of operatives or persons required to fully plant a given area within a certain time after a distribution of the plants has been made.

In the operation of the improved portable transplanter or setter the user is enabled to remain in a practically upright position to form the hole for the plant, dispose the plant securely and properly into the hole, water the same, and afterward fully cover the roots without injury to the plant, and, further, to secure uniformity in the depth of planting and relative distance apart of the plants.

The improved implement is particularly adapted to be used in connection with a reservoir, tank, or analogous device carried by the operator and includes means whereby the supply of liquid to the implement may be readily regulated without waste, and in some instances when the implement is not in use the contents of the tank or reservoir may be sprinkled over the plants deposited in the soil. While ordinary water will be generally fed to the implement for deposit around the plant, it will be understood that any suitable fertilizing liquid or a liquid having peculiar propagating characteristics may be fed to the implement.

The main feature of the present invention is a simplified organization of a receptive and holding nature having penetrative characteristics, the implement being of such structure that the contents thereof may be maintained intact while a hole is formed in the soil to receive a plant without resorting to the utilization of an auxiliary tube or conduit practically independent of the penetrative portion of the implement.

Figure 2:
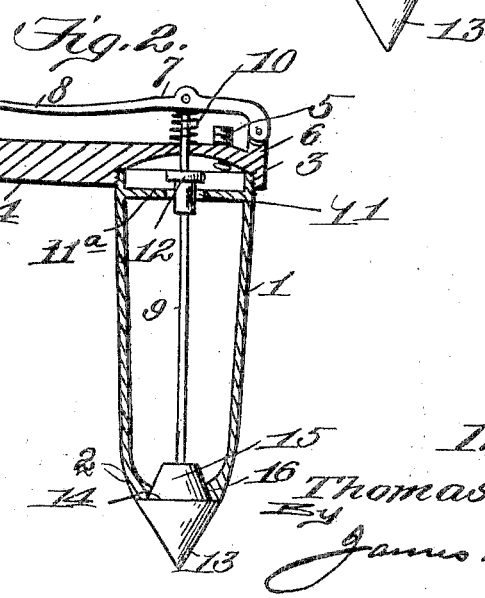

In the drawings, Figure 1 is a side elevation of a simplified form of the transplanting implement embodying the features of the invention. Fig. 2 is a transverse vertical section through the simplified implement, showing the parts arranged to deliver the contents of the implement to the plant. Fig. 3 is an elevation of an implement embodying a modification in the construction.

Similar numerals of reference are employed to indicate corresponding parts in the several views.

In the form of the device shown by Figs. 1 and 2 the body 1 is in the nature of a receptacle with an outer smooth surface and gradually tapers toward its lower extremity to produce a penetrative structure, the lower end 2 of this body having its wall thickened to reinforce or strengthen the same to resist crushing or bending thereof during insertion in the ground. On the upper end of the body 1 a cap 3 is secured by any suitable means and may be attached by screw-threads, so that it can be removed, if found necessary, and projecting from the said cap is a handle or grip 4, which is disposed at an angle to the body 1. Connecting with the cap 3 is a nipple 5, to which a rubber tube or flexible pipe from a reservoir or tank is adapted to be attached. Rising from the cap or cover 3 at a point diametrically opposite the connection therewith of the handle or grip 4 is an upright 6, to which one end of a valve-operating lever 7 is pivotally attached, the opposite extremity 8 of said lever being adapted to have the thumb of the operator applied thereto in actuating the same. At an intermediate point the upper end of a valve-stem 9 is attached to the lever 7, and between the lever and the cap 3 a coil-spring 10 surrounds the stem and operates to return the said lever and the parts coöperating with the stem 9 to normal position.

In the form of the device shown by Figs. 1 and 2 a valve opening or seat 11 is formed in a partition 11$^a$, located a suitable distance below the cap in the upper extremity of the body 1 and forming with said cap a chamber or space in the upper part of the body with which the nipple 5 communicates. This chamber or space 12ª receives fluid, which therefrom passes through the valve-opening 11 in the partition 11ª into the body 1 below said partition. The reservoir or tank for feeding the implement, together with the flexible tubular connection, is shown by Fig. 1, and said reservoir is intended to be carried on the back of the operator and provided with another outlet-tube having a spray-nozzle controlled by a valve, whereby the contents of the reservoir may be thrown over the plants by a spraying operation after transplanting is effected.

A penetrative point 13 is arranged to operate in conjunction with the lower extremity of the body 1 and is preferably solid and formed with an upper circumferential shoulder 14 to provide a valve-boss 15 to snugly fit in an outlet-opening 16 in the lower end of the body. The upper maximum diameter of the point 13 corresponds to the diameter of the lower end of the body 1, and when the point is in normal position with respect to the body a practically smooth joint is established between the two parts to avoid obstruction in the operation of forcing the point and body into the ground to form a hole for setting a plant. The valve-stem 9 has its lower end attached to the center of the valve-boss 15, and when the valve 12 is closed by a downward pressure exerted on the stem 9 through the operation of the lever 7 the point 13 is simultaneously pushed downwardly away from the lower end of the body 1 and the opening 16 is cleared by the valve-boss 15. When the valve-stem 9 is operated by pressure applied on the lever 7 to throw the point 13 downwardly and clear the lower end of the body, the valve 12 is closed and the fluid which may flow into the chamber 12ª is prevented from entering the body 1, and therefore unnecessary loss or dispensation of the fluid is avoided. As soon as the valve-stem is released and the valve 12 and point 13 returned to normal position the fluid is permitted to pass downwardly into the body 1, and thereby automatically refill the latter without any special attention by the operator.

In the modified form of the device as shown by Fig. 3 the cap 3ª is of smaller dimensions than that heretofore set forth and is applied to the upper terminal of an auxiliary or tubular extension 17, having an intermediate cap 18 applied over the upper end of the body 1, the auxiliary or tubular extension 17 having an inlet-nipple 19 similar to the nipple 5, heretofore explained. The intermediate cap 18 is formed with a valve-seat 11ᵇ to receive a valve 12ᵇ, corresponding in all respects to the valve and seat heretofore set forth. In this instance the valve-stem 9 is formed with a vertical extension 20, passing upwardly through the center of the auxiliary or tubular extension 17 and the cap 3. The remaining features of structure in this modification are similar to those heretofore set forth and have like reference-numerals applied thereto.

The modification shown by Fig. 3 indicates that the implement may be extended or lengthened as much as desired to lessen the stooping posture of the operator. If desired, the implement might be extended sufficiently to obviate any bending of the body of the user while forming a hole in the ground to receive a plant.

The cap 3, as shown by Figs. 1 and 2, as well as that shown by Fig. 3, and the rim 18 of the tubular extension 17 will be so attached to the parts that they engage as to be readily separable for cleaning or other purposes, and likewise the point 13 will be detachable from the stem 9.

In the use of the device it is pressed into the ground by bearing on the handle 4 to form a hole, and in the latter the plant is deposited, and afterward the operator presses downwardly on the enlarged extremity or broadened end 8 of the lever 7 and forces the valve 12 into the opening with which it coöperates, and simultaneously the point 13 is pushed below the lower extremity or end of the body 1, the implement being held over the plant during this operation to permit the contents of the body to flow over the plant. This operation can be regularly and normally pursued, and as soon as the contents of the body 1 are exhausted pressure is relieved from the lever 7 and the valve 12 and point 13 returned to normal position. As shown by Fig. 3, the body is provided with a tubular extension 17, so that a greater quantity of liquid can be retained in the device, the liquid passing from the said tubular auxiliary extension 17 of the body when the valve 12 is opened.

The proportions and dimensions of the improved implement can be modified at will, and, further, if found necessary, suitable packing may be applied to the valve and point to obstruct any tendency to leakage, particularly between the point 13 and the lower end of the body 1.

It is preferred that metal be used in the structure of the several parts of the implement; but at times it may be found practicable to use both metal and wood. Furthermore, a material advantage results in the attachment of the implement by means of a flexible tube or pipe to a tank or receptacle and also to have in connection with the latter a second pipe or tube carrying a spraying device to permit the contents of the reservoir to be applied either directly to the plants when placed in the ground or after they have been transplanted.

Having thus fully described the invention, what is claimed as new is—

1. In a device of the class set forth, the combination of a fluid-receiving receptacle having the upper extremity closed and forming a penetrative body, a penetrative point coöperative with the lower extremity of said body and a valve mechanism attached to and simultaneously operative with the point, the valve mechanism controlling the flow of fluid into the body and operating the penetrative point to clear the end of the body with which it engages when pressed downwardly.

2. In a device of the class set forth, the combination of a fluid-receiving body having an upper closed extremity and a general penetrative structure, a penetrative point movably held in coöperation with the lower extremity of the body, a valve mechanism operating within the body normally holding the penetrative point in closed condition and by its downward movement clearing said point from the end of the body with which it engages, and means for supplying fluid to the body, the supply of the fluid to the body being checked in its flow into the body when the pentrative point is open.

3. In a device of the class set forth, the combination of a receptive body tapered toward its lower extremity and tubular to receive and hold fluid therein, the upper extremity of the body being closed, a penetrative point movably coöperating with the lower end of said body and having means for closing the latter, and a device attached to the said point and coöperating within the body to check the flow of fluid into the latter when the penetrative point is opened.

4. In a device of the class set forth, the combination of a receptive body, tapered toward its lower extremity and hollow to receive a charge of fluid, a closure means fitted over the upper extremity of the body, a partition in the body having a valve-seat, a valve coöperating with said seat and connected to a stem operative from the exterior of the body, and a penetrative point movably engaging the lower end of the body and projectable from the latter and connected to the valve-stem, the penetrative point being opened with respect to the body when the valve is closed.

5. In a device of the class set forth, the combination of a tubular body having an opening at its lower extremity and a closure at the upper portion thereof, the interior of the body having means adapted to be closed by a valve to control the flow of fluid into the body, said valve, a penetrative point applied to the lower extremity of the body and connected to the valve and projectable downwardly from the body simultaneously with the closing movement of the valve, and means for exteriorly operating the valve.

6. In a device of the class set forth, the combination of a tubular penetrative body having the lower portion of its wall increased in thickness to reinforce the same, and an opening in the lower extremity, a solid point movably applied to the lower end of the body and having a valve device to close the opening, a handle coöperating with the body, and an upper valve connected to the point and exteriorly operative.

7. In a device of the class set forth, the combination of a tubular penetrative body having a point movably applied to the lower end thereof and projectable therefrom, valve devices coöperating with the body and connected to the point to control the admission of liquid to the body, a tubular extension on the upper portion of the body, and means for supplying the body with liquid.

In testimony whereof I have hereunto set my hand in presence of two subscribing witnesses.

THOMAS J. PETERS.

Witnesses:
   THOS. J. H. HENDRIX,
   A. W. BASCOM.